United States Patent Office 2,711,947
Patented June 28, 1955

2,711,947
STABILIZED HYDROCARBON FUEL OILS CONTAINING A CONDENSATION PRODUCT OF AMMONIUM SULFIDE, FORMALDEHYDE, AND A MONO-ALKYL PHENOL

Herschel G. Smith, Wallingford, and Troy L. Cantrell, Lansdowne, Pa., assignors to Gulf Oil Corporation, Pittsburgh, Pa., a corporation of Pennsylvania No Drawing. Application August 28, 1950,
Serial No. 181,928

4 Claims. (Cl. 44—62)

This invention relates to stabilized hydrocarbon fuel oils, and more particularly to furnace oils, diesel fuels, and the like, stabilized against discoloration, the formation of sludge, and undesirable degradation products appearing after storage of the fuel. The invention is primarily concerned with fuels commonly referred to as "middle oil distillates" as will more fully appear hereinafter.

The storage of fuel oils, furnace oils, and the like is in many instances complicated by the formation of undesirable products in the fuel oils as evidenced in several ways. After prolonged periods of storage many fuels tend to discolor, and ultimately insoluble material is formed in the fuel. This insoluble material precipitates out and leads to the formation of sludge. These products, and possibly others remaining in the fuel oils, cause the clogging of screens, conduits and other parts of burners, the formation of deposits on burners, commonly referred to as "toadstools," and exhibit additional undesirable properties.

The degradation of fuel oils upon storage is apparently due to the action of air in contact with the fuel, coupled with the effect of light, particularly ultraviolet radiation. This degradation is generally believed to be the result of three types of reactions. Two of these, oxidation and polymerization of unsaturates, probably account for a great deal of the contaminants appearing after prolonged periods of storage. In addition, where cracked distillates resulting from catalytic cracking operations are blended with fuel oils, the discoloration of the fuel and formation of sludge appears to be aggravated. This is probably due to the rearrangement or activation of sulfur compounds contained in the cracked distillates. In this active state such compounds may catalyze the oxidation and polymerization of unsaturated compounds and/or the sulfur compounds may react with the olefinic hydrocarbons to form soluble polymers which discolor the fuel. In all probability, all of these reactions take place upon storage, so that fuels which have been stored for many months may be characterized by discoloration, the formation of insoluble material, acidity and other deleterious properties.

The discoloration of fuels is particularly aggravated in the case of fuels which have been exposed to light while under storage conditions. This difficulty is encountered with both cracked and uncracked fuels, although the problem appears to be serious in the case of uncracked fuels only when high sulfur stocks are involved or the sulfur is in a particularly active state.

An acceptable fuel for use in oil burners and diesel engines must, of course, be free from any tendency to clog filter screens and the numerous fine passages and openings present in fuel oil burners and in diesel engines. The fuel oil used in such equipment can interfere with the performance of various parts in several ways, among which are clogging, gumming, and corrosion. Particularly detrimental to good performance are sediments, which may be of the so-called "casual" or "non-casual" types. Casual sediments include sand, dirt, iron, rust, dust, water, emulsions and miscellaneous debris. Casual sediments may be avoided by simply keeping the original oil clean and free from extraneous insoluble materials. The non-casual sediment is that sediment which may form in an oil during use or storage. Such sediment is an organic material originating mainly in oxidation and polymerization of all, or a portion of, the oil. As has been stated, this oxidation and polymerization results from the presence of oxygen or air and probably also is due to the presence of certain active sulfur compounds. The non-casual sediments may be very finely divided so as to form a sediment clogging small openings and fine pores of filters; in some cases they further coagulate in the form of coarser sediment forming massive deposits which clog filters and other parts of equipment.

The clogging of copper or copper bearing screens and filters in burners and other equipment is encountered to some extent with uncracked fuels, particularly if petroleum acids are not neutralized or washed out; therefore steps of neutralization and washing should be taken for any distillates containing materials of high neutralization number. In addition, trouble may also be encountered with furnace oils containing cracked distillates through the action of so-called "oxyacids" which are frequently developed in cracked fuels. There appears to be a tendency for such acids to form reaction products with the copper and copper bearing screens and filters. These products tend to coat the wires so as to clog or reduce the size of the open mesh of openings such that even fine insoluble matter will clog them.

The tendency of fuels to clog filters varies with different fuels. However, certain fuels comprising a mixture of uncracked and cracked distillates have a greater tendency to form the non-casual sediment than do the cracked fuels alone. This is probably due to the fact that the decomposition products are less soluble in the uncracked distillates and therefore tend to precipitate out. As pointed out, although the development and settling out of insoluble matter is particularly prevalent with mixtures of cracked and uncracked distillates, this action appears to be more pronounced for high sulfur distillates, either cracked or uncracked.

Acute trouble due to these problems is not likely to be developed with screens and filters in a system where fresh stocks that have not been in storage for a long time are employed. However, difficulties are likely to be encountered by users of furnace oils who have allowed furnaces to remain inactive and the oil to remain in storage over the summer months. In such cases the development and settling out of some insoluble matter may thus be concentrated in the first pumpings when the furnace is started up in the fall.

It has been noted that certain fuels do not begin to clog filters until such fuels have been passed through the filter for a period of time. The period in which there is no substantial clogging of the filter is referred to as the induction period. Obviously, it is highly desirable for a fuel to have a longer induction period since this increases the life of the filter and eliminates frequent shutdowns and operational failures.

It is therefore an object of this invention to provide hydrocarbon fuel oils having improved stability on storage.

More particularly, it is an object of this invention to provide hydrocarbon fuel oils of improved stability against the formation of undesirable color bodies as well as the development and settling out of insoluble matter on storage.

Another object of this invention is to provide improved hydrocarbon fuels having substantially non-clogging tendencies to screens and filters and having a relatively long induction period.

These and other objects are accomplished by the present invention wherein we provide improved fuels, stabilized against the formation of undesirable color bodies and against sludge, comprising a major amount of a hydrocarbon fuel oil and a minor amount, sufficient to inhibit the formation of insoluble matter and undesirable color bodies, of a condensation product obtained by reacting ammonium sulfide and formaldehyde at a mildly elevated temperature with a mono-alkyl phenol having 4 to 12 carbon atoms in the alkyl substituent.

The condensation product, which is added to fuel oils in accordance with our invention, is prepared by reacting the ammonium sulfide, formaldehyde and mono-alkyl phenol at a mildly elevated temperature, say 180° F., but not exceeding 200° F. The exact nature of this reaction product is unknown, but the reaction product contains in chemical combination the respective ingredients employed. The condensation between the reactants proceeds spontaneously upon mixing. Since the reaction is exothermic, care should be taken not to allow the temperature to exceed about 200° F., otherwise dark colored, insoluble products may result. After the condensation is completed, the temperature is raised to distill off all water, both that formed in the condensation and added with the reactants. The reactants are preferably employed in the proportions of 1 mol of ammonium sulfide, 2 to 5 mols of formaldehyde, and 2 to 4 mols of the mono-alkyl phenol.

The mono-alkyl phenols used in preparing the condensation product have from 4 to 12 carbon atoms in the alkyl substituent. Thus, the alkyl substituent includes normal or branched chain butyl, amyl, hexyl, heptyl, octyl, decyl and dodecyl radicals. A preferred alkyl substituent is the tetramethylbutyl radical. The mono-alkyl phenols are preferably obtained by alkylating in known manner, in the presence of concentrated sulfuric acid, phenol with olefins having from 4 to 12 carbon atoms. Olefins, such as butene-1, isobutylene, the amylenes, di-isobutylene and tri-isobutylene are conveniently employed. It is preferred to conduct the alkylation with di-isobutylene since the resulting product is primarily para tetramethylbutyl phenol.

Although it is preferred to emloy the reactants simultaneously or to first react the alkyl phenol and ammonium sulfide followed by condensation with formaldehyde, we have found that the reaction sequence may be varied to produce beneficial products. However, if the alkyl phenol and formaldehyde are first reacted, a better reaction is effected by employing acid alkyl phenol containing some sulfuric acid alkylation catalyst, since the formaldehyde condensation reaction is facilitated by the presence of an acid or alkaline catalyst. If ordinary alkyl phenol is employed, the ammonium sulfide has enough reserve alkalinity to catalyze the formaldehyde condensation as long as it is present when the formaldehyde is introduced.

In view of the multiple points of the respective molecules at which the reactants may react, it is believed that a mixture of compounds is obtained. The designation of the reaction product as a "condensation product" is intended to cover all the compounds present therein.

The following example illustrates a preparation of a typical condensation product used in our fuel oil compositions.

EXAMPLE I

Forty-one parts by weight of filtered octyl phenol (para tetramethylbutyl phenol) were melted at 140° F.; then 34 parts by weight of a 20 per cent aqueous solution of ammonium sulfide were slowly added with agitation. The mixture was stirred and heated to 160° F., at which time 20 parts by weight of 37 per cent aqueous formaldehyde solution were added with continued agitation. After all the formaldehyde had been added the temperature was raised to 180° F. to complete the reaction and held at that temperature for a period of one hour. The condensation product was then dried by increasing the temperature to 280° F., distilling off the water, following which the product was diluted with a sufficient volume of 70/2 Texas oil to produce a concentrate of 50 per cent by weight of the product. The concentrate thus prepared had the following properties:

| | |
|---|---|
| Gravity, ° API | 16.8 |
| Viscosity, SUV: | |
| 100° F | 1425 |
| 210° F | 61.8 |
| Color, NPA | 2.75 |
| Neutralization No | 0.40 |

The reactants in the above example were in the molar proportions of about 1.0 mol of ammonium sulfide, 2.5 mols of formaldehyde, and 2.0 mols of para tetramethylbutyl phenol.

Another run employing substantially these same proportions and conditions, except for the presence of a benzene solvent, after removal of the benzene by blowing with nitrogen, yielded a brittle, resinous product having a fracture like that of a high grade rosin and having the following other characteristics:

| | |
|---|---|
| Color | Pale amber. |
| Specific gravity, 77° F./77° F | 1.0501. |
| Melting point, ° F | 100–110. |
| Solubility in No. 2 fuel oil, percent | 5.0+. |

We have found that the above-described condensation products may be compounded with a wide variety of hydrocarbon fuel oils to impart advantageous properties thereto. For example, both cracked and uncracked distillates and mixtures thereof in the fuel oil boiling range, that is, hydrocarbons boiling within the range of about 350° to 750° F., are stabilized against oxidation deterioration and the formation of undesirable contaminants by a minor amount of the condensation products set forth. By way of illustration, some of the most commonly used fuel oils which are benefited by the condensation products are numbers 1, 2 and 4 fuel oils, the requirements for which are specified in A. S. T. M. specification D396–48T. These specifications appear hereinafter under Table I.

Table I

|  | Grade of Fuel Oil | | |
| --- | --- | --- | --- |
|  | No. 1—A distillate oil intended for vaporizing pot-type burners and other burners requiring this grade of fuel | No. 2—A distillate oil for general purpose domestic heating for use in burners not requiring No. 1 Fuel Oil | No. 4—An oil for burner installation not equipped with preheating facilities |
| Flash Point, °F | min. 100 or legal | min. 100 or legal | min. 130 or legal. |
| Pour Point, °F | max. 0 | max. 20 | max. 20. |
| Water and Sediment, Percent by Vol | max. trace | max. 0.10 | max. 0.50. |
| Carbon Residue on 10% Bottoms, Percent | max. 0.15 | max. 0.35 |  |
| Ash, Percent by Wt |  |  | max. 0.10. |
| Distillation, °F.: |  |  |  |
| 10% at, °F | max. 420 |  |  |
| 90% at, °F |  | max. 675 |  |
| End Point, °F | max. 625 |  |  |
| Viscosity, SUV, seconds: 100°F |  | max. 40 | max. 125. min. 45. |
| Viscosity, Kinematic, Centistokes: 100°F | max. 2.2 / min. 1.4 | max. 4.3 | max. 26.4. min. 5.8. |
| Gravity, °API | min. 35 | min. 26 |  |
| Copper Strip Test, 122°F., 3 Hr | pass |  |  |
| Corrosion Test, 122°F., 3 Hr | do |  |  |

As further illustrative of fuels which are benefited by the condensation products, the specifications for certain diesel fuel oils as prescribed by A. S. T. M. Designation: D975–48T are set forth in Table II.

Table II

|  | Grade of Fuel Oil | | |
| --- | --- | --- | --- |
|  | No. 1-D—A volatile distillate fuel oil for engines in service requiring frequent speed and load changes | No. 2-D—A distillate fuel oil of low volatility for engines in industrial and heavy mobile service | No. 4-D—A fuel oil for low and medium speed engines |
| Flash Point, °F | min. 100 or legal | min. 100 or legal | min. 130 or legal. |
| Pour Point, °F | max. 20 | max. 20 | max. 20. |
| Water and Sediment: Percent by Vol | max. trace | max. 0.10 | max. 0.50. |
| Carbon Residue on 10% Bottoms, Percent | max. 0.15 | max. 0.35 |  |
| Ash, Percent by Wt | max. 0.01 | max. 0.02 | max. 0.10. |
| Distillation: |  |  |  |
| 90% at, °F |  | max. 675 |  |
| End Point, °F | max. 625 |  |  |
| Viscosity, SUV, seconds: 100°F |  | max. 45 | max. 125. min. 45. |
| Sulfur, Percent by Wt | max. 0.50 | max. 1.0 | max. 2.0. |
| Copper Strip Corrosion | negative | negative |  |
| Cetane Number | min. 40 | min. 40 | min. 25. |

In accordance with our invention, small proportions of the herein-described condensation products in fuel oils will substantially reduce the tendency to form insoluble constituents, undesirable color bodies and the tendency of the fuel to clog screens and filters in burners and other equipment. The amount of condensation product used is sufficient to stabilize the fuel oil against the formation of sludge or insoluble bodies, and in general, small amounts from 0.001 to 5.0 per cent by weight on the fuel oils, will suffice. The condensation product may be dispersed in fuel oil stocks directly by simple mixing, or it may be introduced to the fuel oil in the form of a concentrate of the condensation product in a minor amount of a fuel oil or hydrocarbon solvent which may be more readily blended with fuel oil.

To determine the effectiveness of the said condensation products on inhibiting the formation of sludge and stabilizing the color of the oil, tests were conducted on a No. 2 furnace oil both before and after treatment with the condensation product of Example I. Of these tests, an oxidation test was selected as most indicative of the environment which appears to induce the formation of sludge and undesirable color bodies. For this purpose A. S. T. M. oxidation test D943–47T was modified somewhat by eliminating the iron and copper catalyst coils as prescribed by the test. In other words, the A. S. T. M. test procedure as outlined in test D943–47T was followed employing the glass parts of the A. S. T. M. oxidation assembly for blowing a sample of the fuel oil with oxygen. Briefly, the test employed comprised placing a 300 cc. sample of the fuel oil in a flask immersed in an oil bath at 300° F. and blowing oxygen through the sample for a period of two hours at the rate of 3 liters of oxygen per hour. The sample was then filtered and the weight of insoluble material or sludge formed was noted. The color was also noted. This test bears the designation "Gulf Method 327, Modified."

EXAMPLE II

Table III hereinbelow shows the results of this test when conducted on a No. 2 furnace oil comprised of 75 per cent uncracked and 25 per cent cracked distillates both before and after improvement by the addition of 0.05 per cent by weight of the condensation product prepared according to Example I.

Table III

|  | Unimproved Oil | Improved Oil |
| --- | --- | --- |
| Gravity, °API | 33.8 | 33.7. |
| Color, NPA | 1.75 | 1.75. |
| Neutralization No | 0.06 | 0.03. |
| Carbon Residue, Percent | trace | trace. |
| Oxidation Test—Method 327, Gulf: |  |  |
| Color NPA | 7.5 | 4.75. |
| Insoluble, Mg./300cc | 70.0 | 10.0. |
| Appearance | clear | clear. |

Another test was devised to simulate, on an accelerated basis, the conditions and effects prevailing upon long exposure of fuel oil to copper screens in burner systems. In brief, the test comprises exposing a sample of fuel oil in the presence of a copper screen to ultraviolet light and observing the effects after lapse of a specific period of time. The oil was placed in standard quartz tubes holding 100 cc. samples, the quarts tubes providing full effect for the ultraviolet light without the error that may occur with glass tubes which absorb actinic light rays. A 2 by 3 in., 60 mesh, copper screen, bent in the form of a cylinder, was suspended in the middle of the oil in each quarts tube by means of two fine wire hangers placed through two side slots of the top cork. The tubes were then placed in a Weatherometer at a distance of about 10 inches from a source of ultraviolet light derived from a standard type C–3B Eveready carbon arc solarium unit. The temperature was maintained at 111° F., and the exposure continued for a period of 24 hours, after which the color and general appearance of the oil were noted. This test bears the designation "Gulf Method 332, Modified."

EXAMPLE III

Table IV hereinafter shows the results of the ultraviolet light test when conducted on the same No. 2 fuel oil employed in Example II, both before and after improvement by the addition of 0.01 per cent by weight of the product prepared according to Example I.

*Table IV*

|  | Unimproved Oil | Improved Oil |
| --- | --- | --- |
| Ultraviolet Light Test Method 332, Gulf, Mod. Quartz Tube, 111° F., 24 Hr., 6 sq. in. Copper Screen: | | |
| Color, NPA | 7.5 | 2.0 |
| Appearance | precipitate | clear. |

It is apparent from the above data that the condensation products described hereinabove remarkably inhibit the formation of sludge in furnace oils, and further, substantially stabilize the color thereof. Thus, very small amounts of the inhibitors set forth are sufficient for retarding the development of color and sediment in fuel oils upon aging.

Under certain conditions, however, the rusting of iron surfaces of storage tanks or other equipment may be encountered, particularly where promoted by the presence of water. For most purposes the improved fuel oils of our invention are stabilized against the formation of rust, but where extreme conditions are encountered which unduly aggravate rust and corrosion, it is contemplated within the scope of our invention to include in the fuel oils other inhibitors to retard the formation of rust and prevent corrosion. Such rust and corrosion inhibitors are well known in the art and a wide variety of them can be employed where necessary.

Resort may be had to such modifications and variations as fall within the spirit of the invention and the scope of the appended claims.

What we claim is:

1. A fuel oil composition comprising a major amount of a hydrocarbon fuel oil and a minor amount, sufficient to stabilize the fuel oil against the formation of sludge and undesirable color bodies, of the product obtained by the process which comprises condensing in an aqueous medium one mol of ammonium sulfide and from 2 to 5 mols of formaldehyde at a temperature not exceeding 200° F. with from 2 to 4 mols of a monoalkyl phenol having from 4 to 12 carbon atoms in the alkyl substituent.

2. The composition of claim 1, wherein said product is present in an amount of from 0.001 to 5 per cent by weight of the fuel oil.

3. A fuel oil composition comprising a major amount of a hydrocarbon fuel oil and a minor amount, sufficient to stabilize the fuel oil against the formation of sludge and undesirable color bodies, of the product obtained by the process which comprises condensing an aqueous solution of about one mol of ammonium sulfide and about 2.5 mols of farmaldehyde at a temperature of about 180° F. with about 2 mols of para tetramethylbutyl phenol.

4. The composition of claim 3, wherein said product is present in an amount of from 0.001 to 5 per cent by weight of the fuel oil.

References Cited in the file of this patent

UNITED STATES PATENTS

| 1,194,201 | McCoy | Aug. 8, 1916 |
| 2,178,545 | Ter Horst | Nov. 7, 1939 |
| 2,348,638 | Mikeska et al. | May 9, 1944 |

FOREIGN PATENTS

| 269,970 | Great Britain | 1927 |